(12) United States Patent
Li

(10) Patent No.: US 11,770,402 B2
(45) Date of Patent: Sep. 26, 2023

(54) SYSTEMS AND METHODS FOR NETWORK DEVICE DISCOVERY AND VULNERABILITY ASSESSMENT

(71) Applicant: Fortinet, Inc., Sunnyvale, CA (US)

(72) Inventor: Haitao Li, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 283 days.

(21) Appl. No.: 17/185,580

(22) Filed: Feb. 25, 2021

(65) Prior Publication Data
US 2022/0272116 A1 Aug. 25, 2022

(51) Int. Cl.
| *H04L 29/00* | (2006.01) |
| *H04L 9/40* | (2022.01) |
| *G16Y 30/10* | (2020.01) |
| *G16Y 10/75* | (2020.01) |
| *H04L 61/5007* | (2022.01) |

(52) U.S. Cl.
CPC .......... *H04L 63/1433* (2013.01); *G16Y 10/75* (2020.01); *G16Y 30/10* (2020.01); *H04L 61/5007* (2022.05)

(58) Field of Classification Search
CPC . H04L 63/1433; H04L 61/5007; H04L 63/20; G16Y 10/75; G16Y 30/10
See application file for complete search history.

(56) References Cited

U.S. PATENT DOCUMENTS

| 9,781,150 | B1 * | 10/2017 | Zhao | G06N 20/00 |
| 10,523,706 | B1 * | 12/2019 | Richards | H04L 63/1483 |
| 10,749,893 | B1 * | 8/2020 | Dahlberg | G06Q 10/067 |
| 11,018,943 | B1 * | 5/2021 | Vasseur | H04L 63/20 |
| 2014/0281524 | A1 * | 9/2014 | Legacy | H04L 63/20 713/168 |
| 2016/0308821 | A1 * | 10/2016 | Siba | H04L 63/20 |
| 2017/0364423 | A1 * | 12/2017 | Peng | G06F 11/203 |
| 2018/0089676 | A1 * | 3/2018 | Narasimhan | G06Q 30/0269 |
| 2018/0089742 | A1 * | 3/2018 | Narasimhan | G06Q 30/0633 |
| 2018/0123894 | A1 * | 5/2018 | Junio | H04L 63/1433 |
| 2018/0159751 | A1 * | 6/2018 | Zhang | H04W 12/122 |
| 2018/0203915 | A1 * | 7/2018 | Marshall | G06F 16/00 |
| 2018/0270229 | A1 * | 9/2018 | Zhang | H04L 63/102 |
| 2018/0375887 | A1 * | 12/2018 | Dezent | H04L 43/08 |
| 2019/0037358 | A1 * | 1/2019 | Jenkins | H04L 61/5007 |
| 2019/0098028 | A1 * | 3/2019 | Ektare | H04L 63/1416 |
| 2019/0124094 | A1 * | 4/2019 | Jusko | H04L 63/101 |
| 2020/0162503 | A1 * | 5/2020 | Shurtleff | H04L 41/0883 |
| 2020/0195508 | A1 * | 6/2020 | Benjamin | H04L 45/122 |
| 2020/0351239 | A1 * | 11/2020 | Gray | H04L 61/251 |
| 2020/0358794 | A1 * | 11/2020 | Vasseur | G06N 20/00 |
| 2020/0382553 | A1 * | 12/2020 | Savalle | G06N 20/00 |
| 2021/0099489 | A1 * | 4/2021 | Ivanov | H04L 63/1416 |
| 2021/0120070 | A1 * | 4/2021 | Ponce | H04L 12/4641 |

(Continued)

FOREIGN PATENT DOCUMENTS

| CN | 108600414 A | * | 9/2018 | .......... G06K 9/6218 |
| CN | 114201650 A | * | 3/2022 | |

*Primary Examiner* — Don G Zhao

(57) ABSTRACT

Various embodiments are discussed that provide systems and methods for identifying possible unsecured devices on a network. In some cases, embodiments discussed relate to systems and methods for identifying possible unsecured devices; clustering the identified devices with other similar devices, and/or determining default or simplified access processes for a given cluster of the identified devices.

20 Claims, 7 Drawing Sheets

(56) References Cited

U.S. PATENT DOCUMENTS

| | | | |
|---|---|---|---|
| 2021/0200595 A1* | 7/2021 | Wolpoff | G06F 9/5072 |
| 2021/0243268 A1* | 8/2021 | Davis | H04L 9/0643 |
| 2021/0250369 A1* | 8/2021 | Åvist | H04L 63/1433 |
| 2021/0288981 A1* | 9/2021 | Numainville | H04L 63/0815 |
| 2021/0314233 A1* | 10/2021 | Haddad | H04L 63/104 |
| 2021/0314238 A1* | 10/2021 | Cioffi | H04L 43/55 |
| 2021/0328986 A1* | 10/2021 | Vasseur | H04L 63/20 |
| 2021/0367847 A1* | 11/2021 | Vasseur | H04L 43/10 |
| 2021/0392171 A1* | 12/2021 | Srinivas | G06N 5/047 |
| 2021/0407013 A1* | 12/2021 | O'Shaughnessy | G06Q 30/012 |
| 2022/0224683 A1* | 7/2022 | Solano Gomez | G06N 3/044 |

* cited by examiner

SYSTEMS AND METHODS FOR NETWORK DEVICE DISCOVERY AND VULNERABILITY ASSESSMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to network security, and more particularly to identifying unsecured network devices.

Description of the Related Art

The Internet of Things (hereinafter "IoT" or "IOT") is a system of interrelated computing devices, mechanical and digital machines provided with unique identifiers (UIDs) and the ability to transfer data over a network without requiring human-to-human or human-to-computer interaction. The number of IoT devices is increasing day each passing day and even as IoT device volume races towards 200 billion by 2020, the vast majority of these devices still have little or no security features in place, leaving them vulnerable to cyber-attacks. IoT devices are increasingly performing important roles in many areas of a modern economy, including facilities for manufacturing, utilities, distribution, recreation, military, residential, commercial, healthcare, and others. IoT devices deal with data that may be personal and may have significant business impacts. Vulnerabilities of IoT devices are a major concern for individuals and organizations. The IoT devices, if compromised, could give hackers not only extra soldiers for a malicious botnet, but also electronic eyes and ears to monitor our lives from afar.

Hence, there exists a need in the art for advanced systems and methods for mitigating security concerns related to IoT and other types of network devices.

SUMMARY

Various embodiments provide systems and methods for identifying possible unsecured devices on a network. In some cases, embodiments discussed relate to systems and methods for identifying possible unsecured devices; clustering the identified devices with other similar devices, and/or determining default or simplified access processes for a given cluster of the identified devices.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
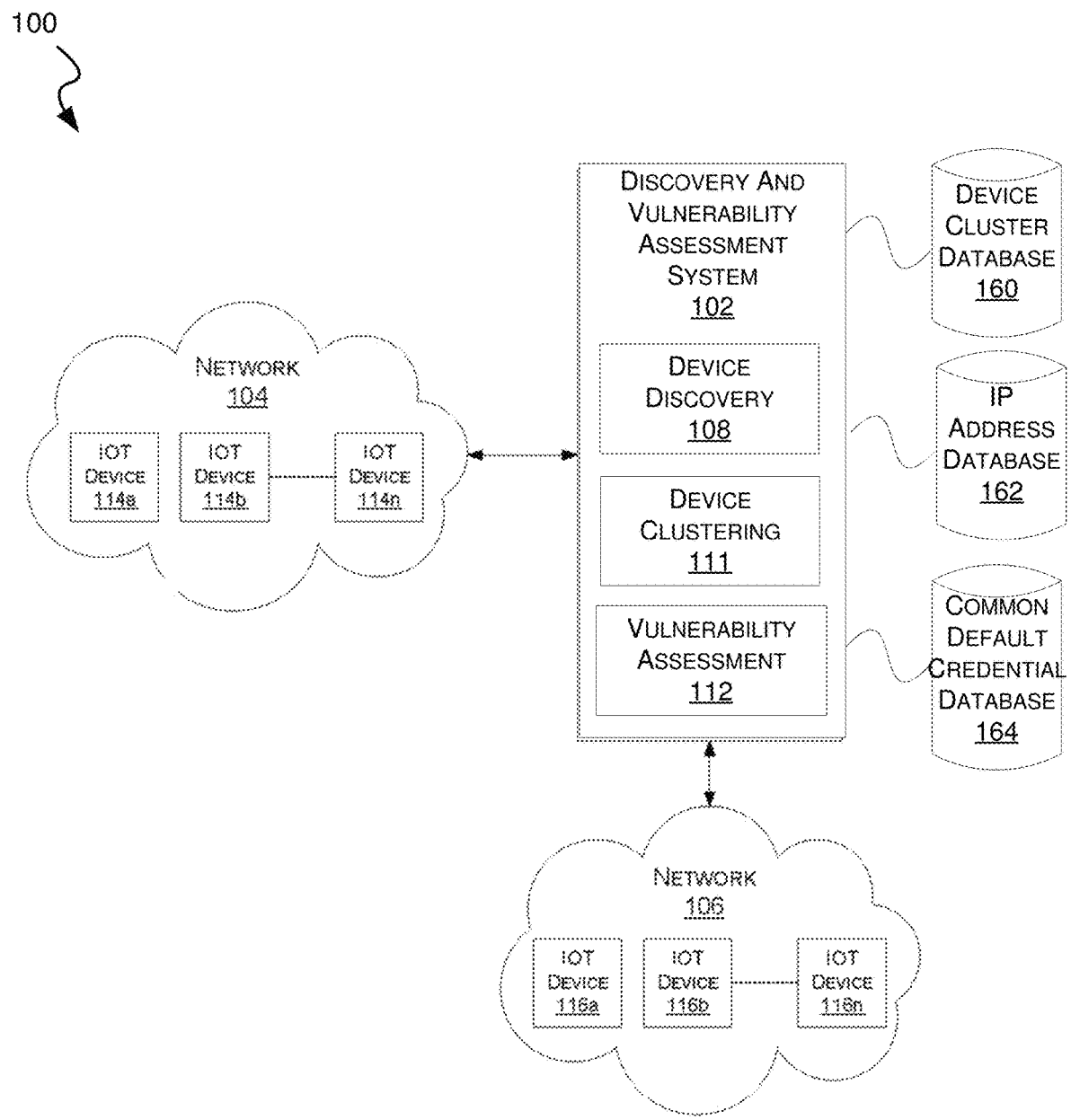
FIG. 1 depicts a discovery and vulnerability assessment system that may be used in relation to one or more networks in accordance with various embodiments.

Various embodiments provide systems and methods for identifying possible unsecured devices on a network. In some cases, embodiments discussed relate to systems and methods for identifying possible unsecured devices; clustering the identified devices with other similar devices, and/or determining default or simplified access processes for a given cluster of the identified devices Systems and methods are described for network device discovery and vulnerability assessment. In an embodiment, a system scans a plurality of Internet Protocol (IP) addresses associated with a plurality of Internet of Things (IoT) devices on the internet, extract displayed contents and webpage tags from webpage associated with each IP active address of the plurality of IP addresses, and finds for each active IP address the best-matching cluster from the plurality based matching of the displayed contents and the webpage tags. The system creates for each active IP address a first set of keywords using the displayed contents and a second set of keywords using webpage tags, matches for each active IP address the first set of keywords and the second set of keywords with the corresponding set of webpage content keywords and set of webpage tags of each cluster of a plurality of clusters, identifies for each active IP address a matching score for each cluster of the plurality of clusters based on the matching, and determines for each active IP address the best-matching cluster of the plurality of clusters based on the matching score. The system may use the Jaccard similarity coefficient to match for each active IP address the first set of keywords and the second set of keywords with the corresponding set of webpage content keywords and set of webpage tags of each cluster of a plurality of clusters.

The system determines for each active IP address a security vulnerability score based on vulnerability assessment performed using credentials associated with the best matching cluster and determines an overall secure vulnerability score for the plurality of IoT devices based on the security vulnerability score determined for each active IP address. The system determines the vulnerability score by attempting to login to the webpage associated with each active IP address of the pluralities of IP addresses using a list of frequently used login credentials associated with the best matching cluster, scoring the security vulnerability score high if the login attempt is successful, and scoring the security vulnerability score low if the login attempt is denied.

In an embodiment, the system is further configured to cluster the plurality of IoT devices into the plurality of clusters based on the determination of the best matching cluster for each active IP address of the plurality of IP addresses. The system may cause the one or more processors to display the overall secure vulnerability score for the plurality of IoT devices and send an alert to one or more concerned users if the security vulnerability score is low. In an embodiment, the system tags product label with each IoT device based on label associated with the best matching cluster. The product label may include a brand name, a product name, and a model number.

Various embodiments provide methods for identifying network vulnerabilities. Such methods include: forming, by a processor, a first device cluster, where the first device cluster includes at least a first Internet Protocol (IP) address corresponding to a first type of network device; forming, by the processor, a second device cluster, where the second device cluster includes at least a second IP address corresponding to a second type of network device; comparing, by the processor, a third IP address to the first device cluster, where the third IP address accesses an accessed network device that is similar to the first type of network device; and adding, by the processor, the third IP address to the first device cluster based at least in part on the comparing the third IP address to the first device cluster. In some instances of the aforementioned embodiments, the methods further include: comparing, by the processor, the third IP address to the second device cluster, where the third IP address accesses an accessed network device that is dissimilar to the second type of network device.

In various instances of the aforementioned embodiments, the methods further include: accessing a webpage corresponding to the third IP address; extracting information from the webpage; and forming a third IP address fingerprint based at least in part on the information. In some cases where the first device cluster includes a first device cluster fingerprint corresponding to a first IP address fingerprint of the first IP address, comparing the third IP address to the first device cluster includes comparing the third IP address fingerprint with the first device cluster fingerprint. In some cases. the third IP address fingerprint includes at least one word visually displayed when the webpage corresponding to the third IP address is accessed, and at least one Hypertext Mark-up Language (HTML) tag provided when the third IP address is accessed. In some such cases, the at least one word visually displayed when the webpage corresponding to the third IP address is accessed includes any combination of: a text word, a logo, and/or an image. In some cases, the HTML tag further includes one or more of: a metadata tag, and a search keyword. In various cases where the first device cluster includes a first device cluster fingerprint corresponding to a first IP address fingerprint of the first IP address, the first device cluster fingerprint includes at least one word visually displayed when the webpage corresponding to the first IP address is accessed, and at least one HTML tag provided when the first IP address is accessed, the comparing the third IP address to the first device cluster includes: calculating a Jaccard index between the third IP address fingerprint and the first device cluster fingerprint; and comparing the Jaccard index with a threshold. In some such cases, the threshold is user programmable.

In some instances of the aforementioned embodiments, the methods further include: accessing one or more IP addresses of the first device cluster using one or more default credentials; identifying one of the one or more default credentials that operates to grant access to the first type of network device; and storing the identified one of the one or more default credentials as an access credential for the first type of network device. In some cases, the methods further include: accessing one or more IP addresses of the second device cluster using said one or more default credentials; identifying one of said one or more default credentials that operates to grant access to the second type of network device; and storing the identified one of the one or more default credentials as an access credential for the second type of network device. In various cases, the methods further include sending an alert to one or more users if they are accessing a network including an available suspect network access device of the first type of network access device accessible using the access credential for the first type of network device.

In some instances of the aforementioned embodiments, at least one of the first type of network device is an Internet of Things device. In one or more instances of the aforementioned embodiments, the methods further include: assigning a first label to the first device cluster, where the first label includes at least one of: a brand name of the first type of network device, a product name of the first type of network device, or a model number of the first type of network device; and assigning a second label to the second device cluster, wherein the second label includes at least one of: a brand name of the second type of network device, a product name of the second type of network device, or a model number of the second type of network device.

Other embodiments provide a non-transitory computer-readable storage medium embodying a set of instructions, which when executed by one or more processing resources of a computer system, causes the one or more processing resources to perform a method including: forming, by a processor, a first device cluster, where the first device cluster includes at least a first Internet Protocol (IP) address corresponding to a first type of network device; forming, by the processor, a second device cluster, where the second device cluster includes at least a second IP address corresponding to a second type of network device; comparing, by the processor, a third IP address to the first device cluster, where the third IP address accesses an accessed network device that is similar to the first type of network device; and adding, by the processor, the third IP address to the first device cluster based at least in part on the comparing the third IP address to the first device cluster.

Other embodiments provide network device discovery systems. Such systems include: at least one processor and a memory. The memory includes instructions executable by the at least one processor to: form a first device cluster, where the first device cluster includes at least a first Internet Protocol (IP) address corresponding to a first type of network device; form a second device cluster, wherein the second device cluster includes at least a second IP address corresponding to a second type of network device; compare a third IP address to the first device cluster, where the third IP address accesses an accessed network device that is similar to the first type of network device; and add the third IP address to the first device cluster based at least in part on the comparing the third IP address to the first device cluster.

Embodiments of the present invention include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware, and/or by human operators.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, the phrase "network device" is used in its broadest sense to mean any device accessible via a network. In some cases, the network devices are IoT devices as are known in the art. Such IoT devices may include, but are not limited to, televisions, cameras, voice command devices, and the like. Based upon the disclosure provided herein, one of ordinary skill in the art will recognize a variety of network devices to which embodiments disclosed herein may be applied.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

As used herein a "network resource" generally refers to various forms of data, information, services, applications, and/or hardware devices that may be accessed via a network (e.g., the Internet). Non-limiting examples of network resources include web applications, cloud-based services, network devices, and/or associated applications (e.g., user interface applications), and network security devices and/or associated applications (e.g., user interface applications). Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Turning to FIG. 1, a conceptual block diagram 100 is shown that includes a discovery and vulnerability assessment system 102 deployed in relation to one or more networks 104, 106 in accordance with various embodiments. As shown, discovery and vulnerability assessment system 102 is communicably coupled to two networks (i.e., network 104 and network 106). It is noted that while discovery and vulnerability assessment system 102 is shown coupled to two networks in this embodiment, that it can be coupled to any number of networks. Network 104 communicably couples a large number of network devices 114 (in this case IoT devices 114a, 114b, . . . 114n), and network 106 communicably couples a large number of network devices 116 (in this case IoT devices 116a, 116b, . . . 116n).

Discovery and vulnerability assessment system 102 performs at least three processes: device discovery 108, device tagging 111, and vulnerability assessment 112. The processes are done using data maintained on a device cluster database 160, IP Address database 162, and a common default credential database 164. Discovery and vulnerability assessment system 102 may include one or more processors and one or more memories where the tangible memories include tangible instructions executable by the one or more processors to perform the aforementioned device discovery 108, device tagging 111, and vulnerability assessment 112.

In operation, device discovery 108 includes identifying and fingerprinting network devices (e.g., IoT devices 114 and IoT devices 116) communicably coupled across one or more networks (e.g., network 104 and network 106). In some cases, the process of identifying devices of device discovery 108 is performed by accessing a third party service. As an example, IP addresses may be obtained from wondershare.com. Alternatively, a third party product Rapid7 Sonar, http://opendata.rapid7.com/sonar.http/) may be used to scan and crawl web pages of a given IP address range. Based upon the disclosure provided herein, one of ordinary skill in the art will recognize a variety of sources of IP addresses that may be used in relation to different embodiments. These identified IP addresses are stored to IP address database 162.

The process of fingerprinting network device of device discovery 108 includes accessing each of the IP addresses in IP address database 162 in an attempt generate identifying characteristics of the network device associated with each IP address. Accessing the IP addresses may be done, for example, using an automated web browser that accesses the webpage associated with the selected IP address. The automated web browser returns the webpage in Hypertext Markup Language (HTML).

Figures 5A, 5B:
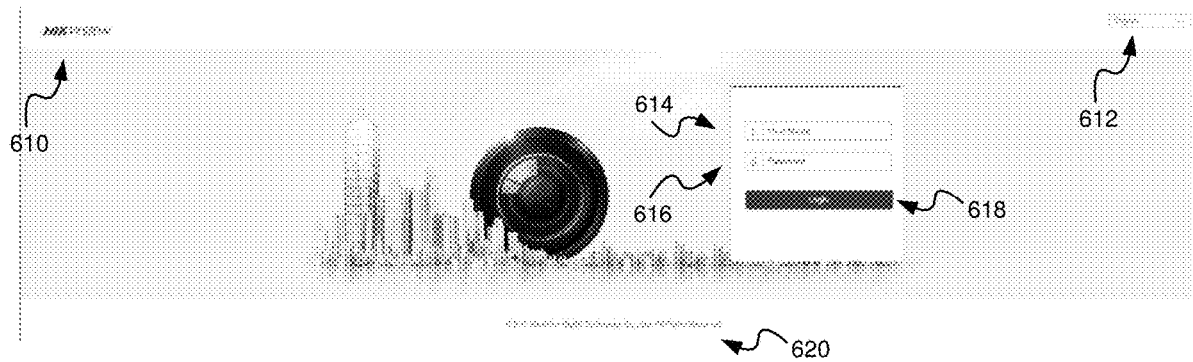
FIG. 5A illustrates an example of displayed contents of a webpage in accordance with one or more embodiments.
FIG. 5B illustrates an example of webpage tags of a webpage in accordance with some embodiments.

The HTML is parsed to extract: (a) words that are visible when the webpage loads, and (b) tags in the HTML. Turning to FIG. 5A, an example web page for the login page of a Hikvision IP camera is shown. A number of words (e.g., Hikvision 610, English 612, User Name 614, Password 616, Login 618, "©2017 Hikvision Digital Technology Co., Ltd. All Rights Reserved" 620) are visible on the page. The parsing process removes words that are to be expected on a given access webpage such as, for example, English 612, User Name 614, Password 616, and Login 618 as they are not very useful for establishing a fingerprint for the IP address. The remaining words are formed into three word subsets or strings as follow: "©2017 Hikvision Digital", "Hikvision Digital Technology", "Technology Co., Ltd.", "Ltd. All Rights", and "All Rights Reserved". These three word strings are stored as a visible word indicator (i.e., set_vw) for the selected IP address.

In addition, a number of HTML tags are included in the retrieved HTML code. The HTML code has a number of tags in the form of, for example:

<html><head><title><meta><meta><meta><meta><body><script><div>

These tags are parsed and stored as three word strings to be used as a tag indicator (i.e., set_tag) which is another set of strings for the selected IP address. Turning to FIG. 5B, an example HTML code for the previously used Hikvision webpage is shown. The tags include: html, head, title, meta, meta, meta, meta, body, script, and div. These tags are formed into three word strings similar to that done with the visible words. In particular, the three word strings include: "html head title", "head title meta", "title meta meta", "meta meta meta", "meta meta body", "meta body script", and "body script div". These three word strings are stored as set_tag for the selected IP address. Together the set_vw and set_tag form an IP address fingerprint for the selected IP address. The selected IP address is stored together with its corresponding IP address fingerprint in IP address database 162.

Device clustering 111 processes the IP addresses into a relatively small group of device clusters. As used herein, a "device cluster" is a group of IP addresses corresponding to network devices that have some similarity between the IP address fingerprints of the respective IP addresses corresponding to the network devices. While there may be tens of millions of more IP addresses associated with network devices, there is only a relatively few actual devices. As an example, one type of network device (e.g., a webcam) may be associated with most of the identified IP addresses. It has been estimated that the Hikvision camera used in the example of FIGS. 5A-5B, accounts for more than one hundred million IP addresses. By clustering similar network devices in accordance with embodiments discussed herein, hundreds of millions or more identified IP addresses can be reduced to only a few thousand clusters or less, and of those few thousand clusters only a few hundred represent a significant number of IP addresses. Using the example of the Hikvision camera used in the example of FIGS. 5A-5B, the more than one hundred million IP addresses are reduced to a single device cluster assigned to the Hikvision camera. As a given IP address fingerprint is potentially against all device clusters, the process continues until either a match is found or each device cluster is considered.

In some embodiments, this clustering process includes comparing the IP address fingerprint for each IP address in IP address database 162 with device cluster fingerprints associated with respective device clusters in device cluster database 160. Where a given IP address fingerprint from IP address database 162 does not reasonably match any of the device cluster fingerprints in device cluster database 160, a new device cluster is created and stored to device cluster database 160. The device cluster fingerprint for the newly created device cluster is equal to the IP address fingerprint for which no match was found. In this way, as new network devices are discovered, a device cluster for the newly discovered device is created. This cluster grows over time to include other IP addresses associated with device that is similar to the newly discovered device.

Alternatively, where a given IP address fingerprint from IP address database 162 reasonably matches one of the device cluster fingerprints in device cluster database 160, the IP address associated with the given IP address fingerprint is stored in relation to the device cluster in device cluster database 160. As such, device clusters in device cluster database may be associated with between one and hundreds of millions of IP addresses depending upon the number of network devices that are found that are similar to others in the particular device cluster.

Determining whether an IP address fingerprint reasonably matches a device cluster fingerprint, some embodiments calculate a Jaccard index for each pairing of one IP address with a number of device cluster fingerprints. Such a Jaccard index is used to calculate a similarity between the set_vw and the set_tag of the currently selected IP address fingerprint and the set_vw and the set_tag of each of the device cluster fingerprints. The following is an example Jaccard coefficient equation where U is a set (i.e., IP address fingerprint and device cluster fingerprint) and A (i.e., IP address fingerprint) and B (i.e., cluster device fingerprint) of U:

$$J(A, B) = \frac{|A \cap B|}{|A \cup B|}$$

As shown, the Jaccard index (i.e., J(A,B)) is the ratio of the number of elements of their intersection and the number of elements of their union. The value of the Jaccard index is 0 when the two subsets are disjoint, and 1 when the two subsets are equal. The Jaccard index exhibits a value between 1 and 0 when the two subsets are neither equal nor disjoint, and the more similarity there is between the two subsets the Jaccard index is closer to 1. Based upon the disclosure provided herein, one of ordinary skill in the art will recognize other distance or similarity calculations that are known in the art that can be used in relation to different embodiments. In some embodiments, an IP address fingerprint is considered a reasonable match to a device cluster fingerprint where the Jaccard index is greater than 0.6. Based upon the disclosure provided herein, one of ordinary skill in the art will recognize a variety of comparison values that may be used in relation to different embodiments.

Vulnerability assessment 112 includes determining whether devices included in a given cluster can be accessed using a commonly used default credential accessed from common default credential database 164. Common default credential database 164 includes a large list of several hundred or more common default credentials used by manufacturers of devices. An example of such a common default credential is: username: Admin, and login: 1234. In some cases, common default credential database 164 is updated as additional default credentials for any network device become known to the implementer of the given embodiment. Based upon the disclosure provided herein, one of ordinary skill in the art will recognize a variety of default credentials used by manufacturers of network devices when selling network devices.

Each cluster in device cluster database 160 is processed by accessing a given IP address associated with the particular device cluster and sequentially applying each of the default credentials from common default credential database 164 to see if one of the credentials results in a grant of access to the suspect device associated with the IP address. Multiple IP addresses associated with the device cluster may be used to distribute the access attempts and avoid a lockout condition occurring due to too many failed access attempts at the same IP address. If a default credential is found that grants access to an IP address associated with the device cluster, that default credential is recorded in relation to the device cluster in device cluster database 160. Alternatively, where no default credential is found for the particular device cluster, failure to identify a default credential is indicated in device cluster database 160.

Using the processes of Discovery and vulnerability assessment system 102, different types of network devices (e.g., IoT devices 114 and IoT devices 116) can be identified, and a determination made as to what a default access to the network device would require. This information can then be used to query a particular user's network to search for network device, match those network devices to respective device clusters similar to the processes of device discovery 108 and device clustering 111. When matching devices are found, it can be determined whether the identified network devices continue to use default access credentials or if the user has changed the default access credentials for the network devices (if possible). Where the user has not changed the default access credentials, a message instructing the user about how to change the credential(s) (if possible) can be sent.

Figure 2:
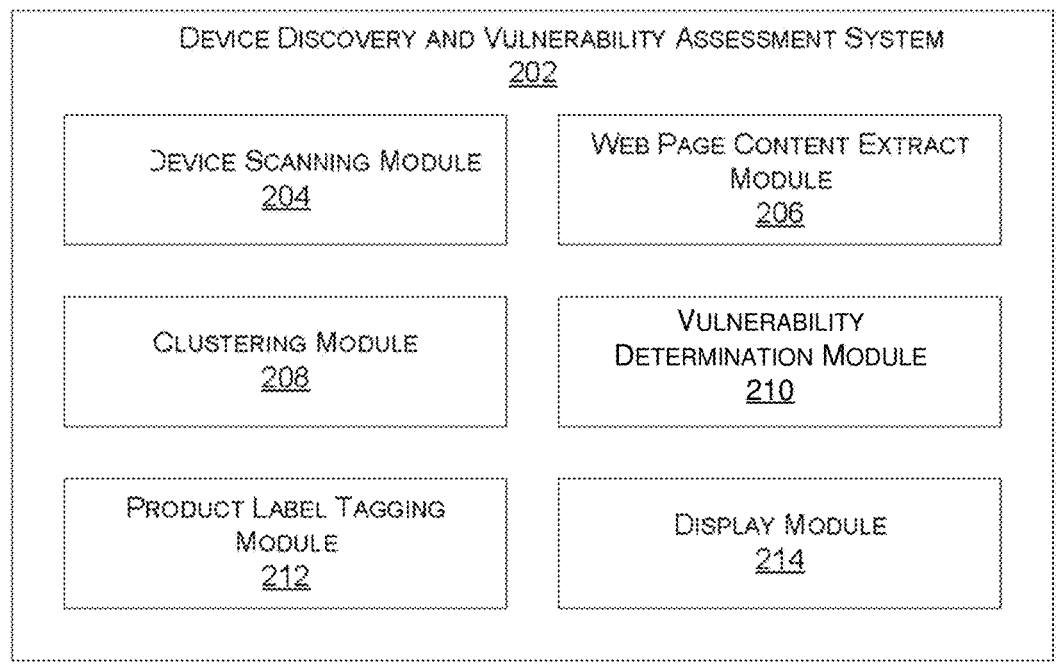
FIG. 2 illustrates the functional modules of a device discovery and vulnerability assessment system in accordance with some embodiments.

Turning to FIG. 2, functional modules of a device discovery and vulnerability assessment system 202 is shown in accordance with some embodiments. A device scanning module 204 controls the above described identifying process of device discovery 108. A Webpage content extract module 106 controls the above described fingerprinting process of device discovery 108. A clustering module 208 performs the above described processes device clustering 111. A vulnerability determination module 211 performs the above described processes of vulnerability assessment 112.

A product label tagging module 212 controls a user interface that allows a user to add a name to a particular device cluster. In other embodiments, product label tagging module 212 selects a name for each device cluster based upon information extracted from the webpage of the devices within the device structure by webpage content extract module 206. A display module 214 controls a display of a device on which product label tagging module 212 is executing.

Figure 3:
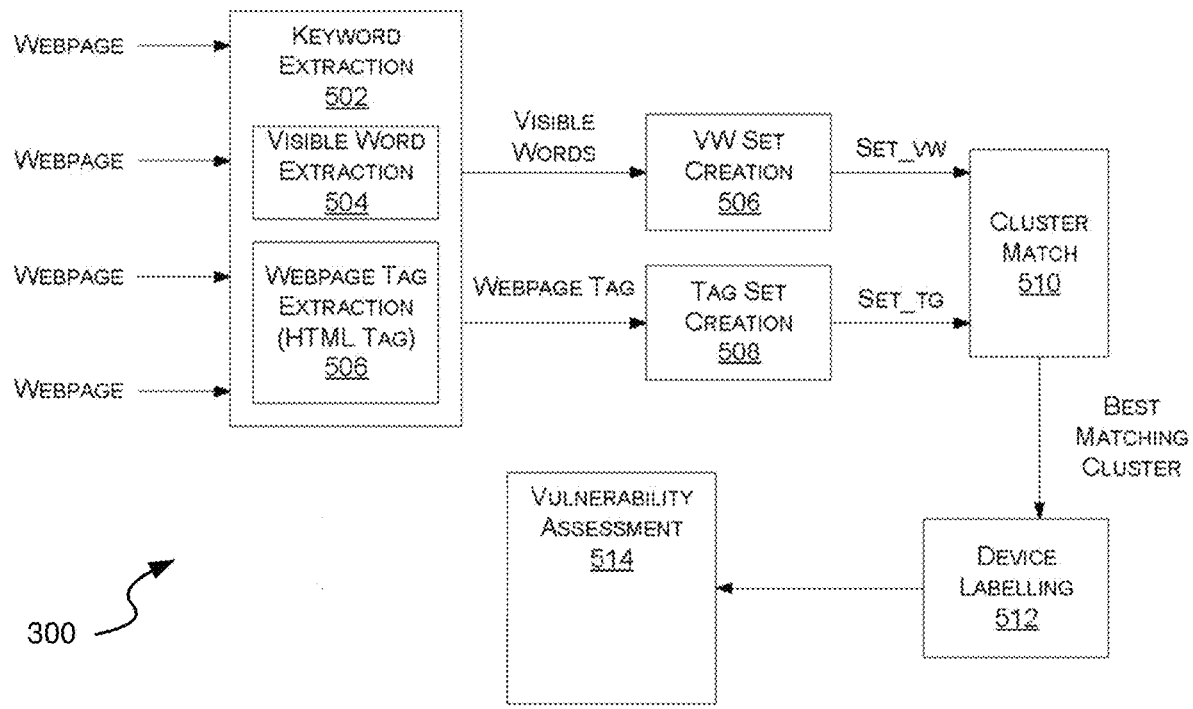
FIG. 3 is a block diagram that conceptually illustrates a process of IP address clustering that may be used in relation to different embodiments.

Turning to FIG. 3, a block diagram 300 conceptually illustrates a process of IP address clustering that may be used in relation to different embodiments. As shown, a keyword extraction module 502 receives a number of webpages. For each webpage that is received, visible word extraction 504 is performed that yields strings of visible words on the webpage, and webpage tag extraction 506 is performed that yields strings of webpage tags. In particular, HTML received for an accessed webpage is parsed to extract: (a) words that are visible when the webpage loads, and (b) tags in the HTML.

The strings of visible words are provided to a visible word set creation module 506, and strings of webpage tags are provided to a tag set creation module 508. Visible word set creation module 506 stores the HTML tags into three word strings to be used as a visual word indicator (i.e., set_vw) which is one set of strings for the selected IP address. Turning to FIG. 5A, an example web page for the login page of a Hikvision IP camera is shown. A number of words (e.g., Hikvision 610, English 612, User Name 614, Password 616, Login 618, "©2017 Hikvision Digital Technology Co., Ltd. All Rights Reserved" 620) are visible on the page. The parsing process removes words that are to be expected on a given access webpage such as, for example, English 612, User Name 614, Password 616, and Login 618 as they are not very useful for establishing a fingerprint for the IP address. Visual work set creation module 506 forms the remaining words into three word subsets as follow: "©2017 Hikvision Digital", "Hikvision Digital Technology", "Technology Co., Ltd.", "Ltd. All Rights", and "All Rights Reserved".

Tag set creation module 508 similarly stores the HTML tags into three word strings to be used as a tag indicator (i.e., set_tag) which is another set of strings for the selected IP address. Turning to FIG. 5B, an example HTML code for the previously used Hikvision webpage is shown. The tags include: html, head, title, meta, meta, meta, meta, body, script, and div. These tags are formed into three word strings similar to that done with the visible words. In particular, the three word strings include: "html head title", "head title meta", "title meta meta", "meta meta meta", "meta meta body", "meta body script", and "body script div". These three word strings are stored as set_tag for the selected IP address. Together the set_vw and set_tag form an IP address fingerprint for the selected IP address.

The IP address fingerprint (e.g., the combination of set_vw and set_tag) is provided to a cluster match module 510. Cluster match module 510 performs the above described processes device clustering 111. Each device cluster is labeled by a device labeling module 512 with either a label that is provided by a user or one that is automatically generated. The device cluster is then vulnerability tested by a vulnerability assessment module 514. Vulnerability assessment module 514 performs the above described processes of vulnerability assessment 112.

Figure 4A:
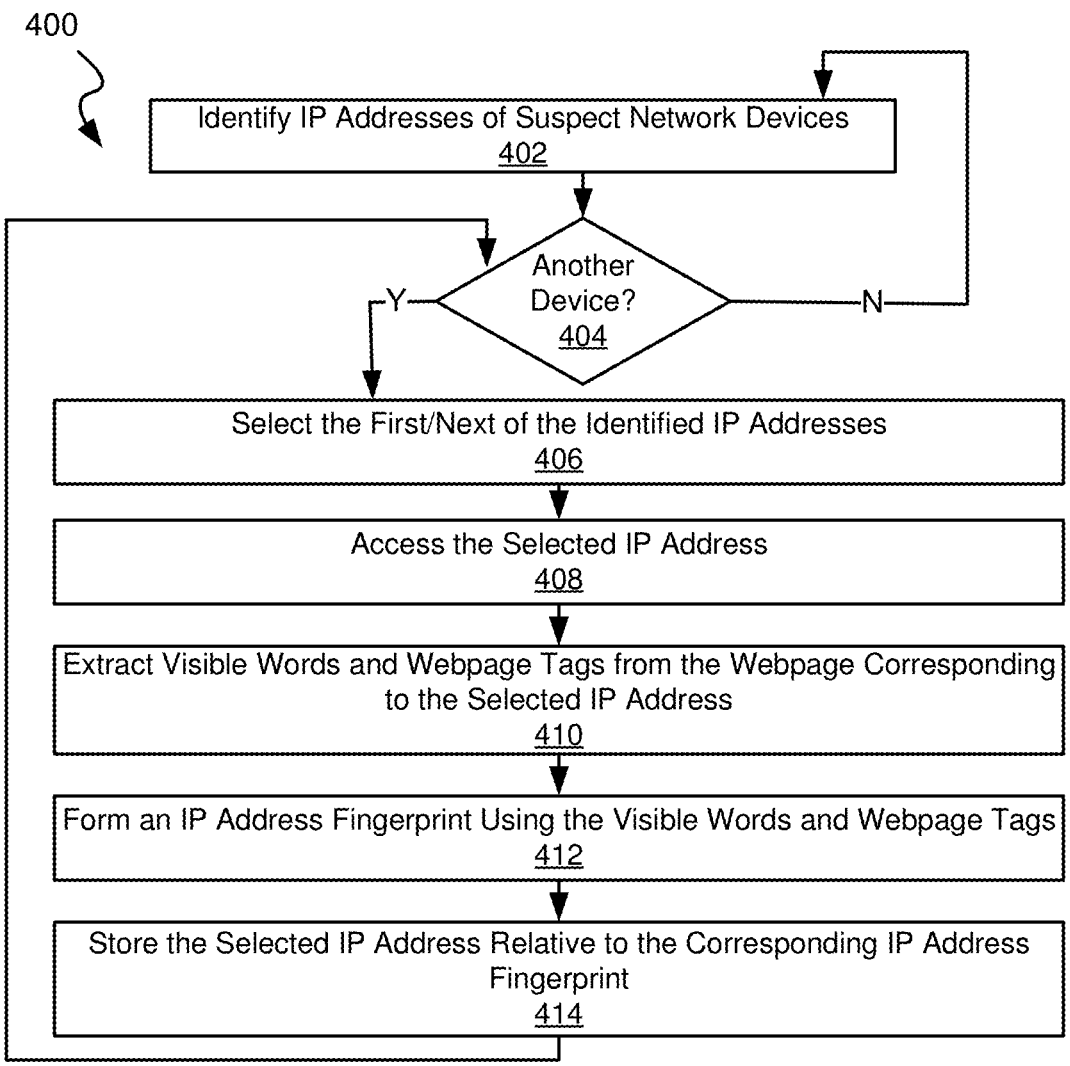
FIGS. 4A-4C are flow diagrams showing a method in accordance with various embodiments for performing network device discovery and vulnerability assessment.
Figure 4B:
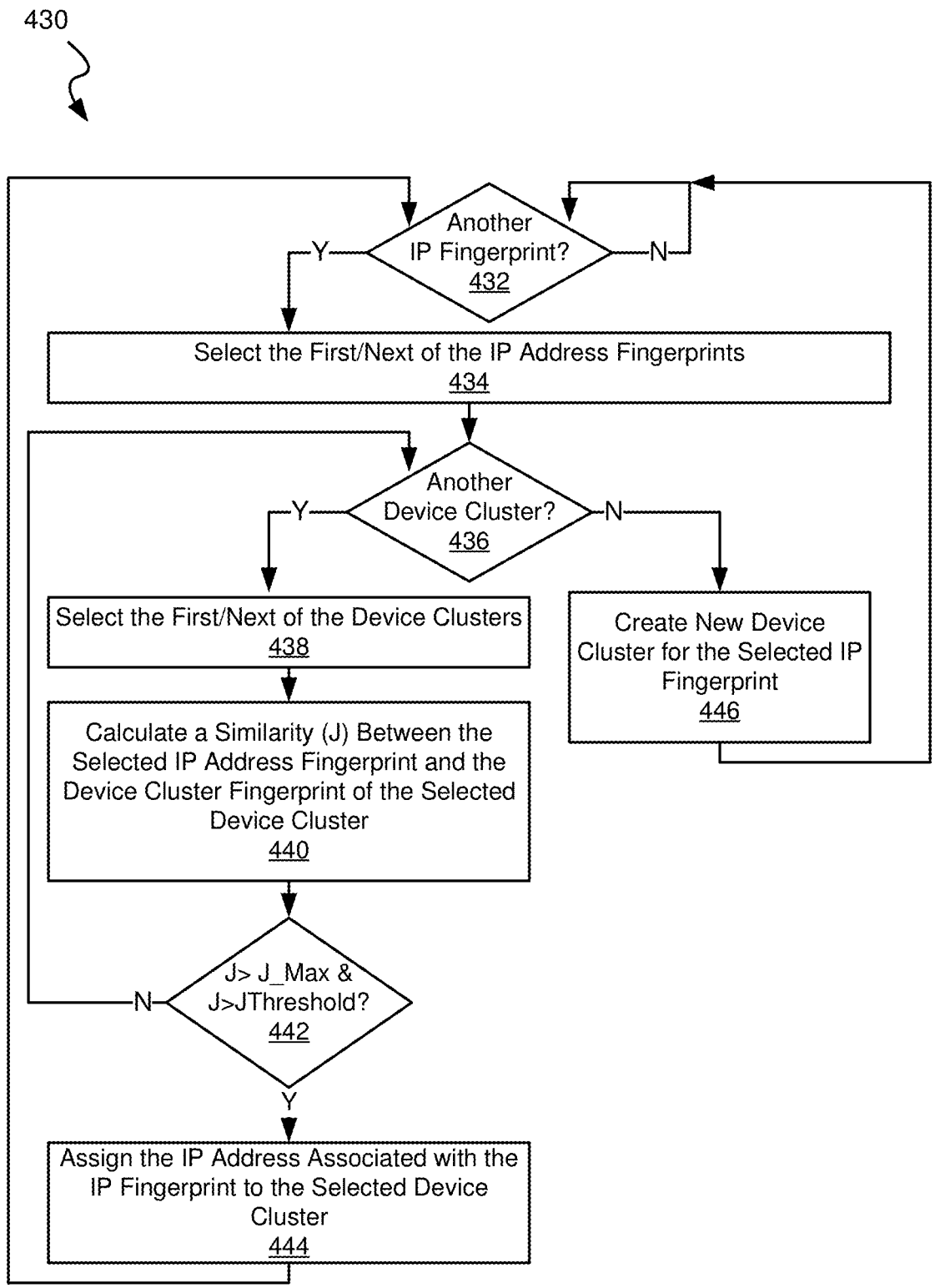
Figure 4C:
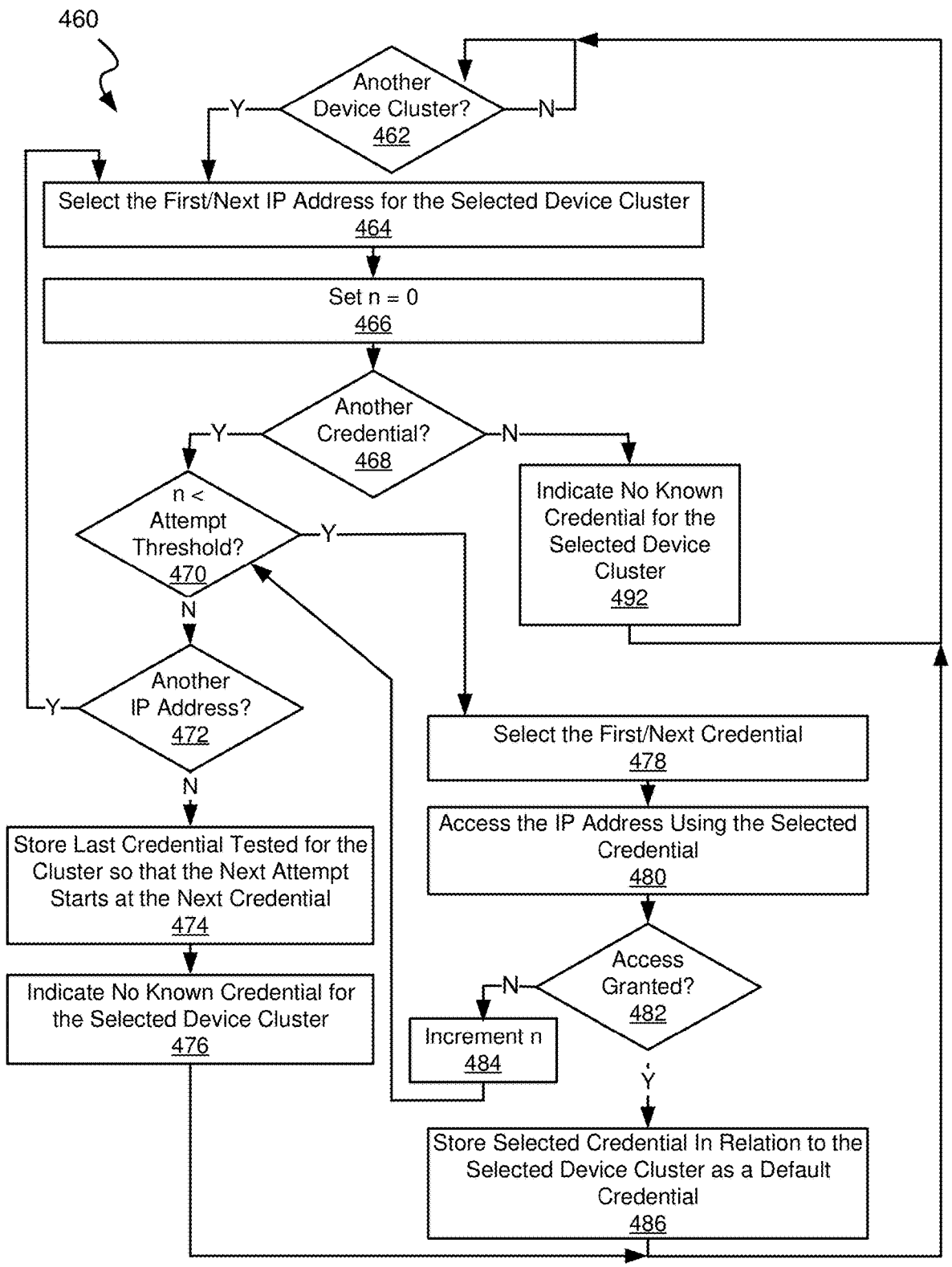

Turning to FIGS. 4A-4C, flow diagrams 500, 530, 560 show a method in accordance with various embodiments for performing IoT discovery and vulnerability assessment. Turning to FIG. 4A and following flow diagram 400, IP addresses for network devices are identified (block 402). In some cases, a third party service is used to identify the IP addresses. As an example, IP addresses may be obtained from wondershare.com. Alternatively, a third party product Rapid7 Sonar, https://opendata.rapid7.com/sonar.http/) may be used to scan and crawl web pages of a given IP address range. Based upon the disclosure provided herein, one of ordinary skill in the art will recognize a variety of sources of IP addresses that may be used in relation to different embodiments.

It is determined if another network device remains to be processed (block 404). Said another way, it is determined whether another IP address for a network device remains. The processes of flow diagram 400 may be applied to each of the IP addresses identified in block 402. Where no additional IP addresses remain to be processed (block 404), the process returns to await identification of additional IP addresses (block 402).

Alternatively, where another IP address remains to be processed (block 404), the next IP address of the identified IP addresses is selected for processing (block 406). This IP address is used to access the network device associated with the selected IP address (block 408). This may include, for example, using an automated web browser that accesses the webpage associated with the selected IP address. The automated web browser returns the webpage in Hypertext Markup Language (HTML).

The HTML is parsed to extract: (a) words that are visible when the webpage loads, and (b) tags in the HTML (block 410). Turning to FIG. 5A, an example web page for the login page of a Hikvision IP camera is shown. A number of words (e.g., Hikvision 610, English 612, User Name 614, Password 616, Login 618, "©2017 Hikvision Digital Technology Co., Ltd. All Rights Reserved" 620) are visible on the page. The parsing process removes words that are to be expected on a given access webpage such as, for example, English 612, User Name 614, Password 616, and Login 618 as they are not very useful for establishing a fingerprint for the IP address. The remaining words are formed into three word subsets as follow: "©2017 Hikvision Digital", "Hikvision Digital Technology", "Technology Co., Ltd.", "Ltd. All Rights", and "All Rights Reserved". These three word strings are stored as a visible word indicator (i.e., set_vw) for the selected IP address.

In addition, a number of HTML tags are included in the retrieved HTML code. The HTML code has a number of tags in the form of

```
<html><head><title><meta><meta><meta><meta><body>
    <scrip><div>
```

These tags are parsed and stored as three word strings to be used as a tag indicator (i.e., set_tag) which is another set of strings for the selected IP address. Turning to FIG. 5B, an example HTML code for the previously used Hikvision webpage is shown. The tags include: html, head, title, meta, meta, meta, meta, body, script, and div. These tags are formed into three word strings similar to that done with the visible words. In particular, the three word strings include: "html head title", "head title meta", "title meta meta", "meta meta meta", "meta meta body", "meta body script", and "body script div". These three word strings are stored as set_tag for the selected IP address.

Together the set_vw and set_tag form an IP address fingerprint for the selected IP address (block 412). The selected IP address is stored together with its corresponding IP address fingerprint (block 414). Again, the processes of blocks 504-514 are repeated for each of the IP addresses identified in block 402.

Turning to FIG. 4B and flow diagram 430, a process for grouping a the identified IP addresses into clusters of similar network devices is shown. Following flow diagram 430, it is determined if another IP address fingerprint remains to be grouped (block 432). The processes of flow diagram 430 may be applied to each of the IP address fingerprints generated using the process of flow diagram 400. Where no IP address fingerprints remain to be processed (block 432), the process returns to await generation of additional IP address fingerprints by the processes of flow diagram 400.

Alternatively, where additional IP address fingerprints remain to be processed (block 432), the next IP address fingerprinting is selected for processing (block 434). It is determined whether another device cluster remains to be considered (block 436). As used herein, a "device cluster" is a group of IP addresses corresponding to network devices that have some similarity between the IP address fingerprints of the respective IP addresses corresponding to the network devices. While there may be tens of millions of more IP addresses associated with network devices, there is only a relatively few actual devices. As an example, one type of network device (e.g., a webcam) may be associated with most of the identified IP addresses. It has been estimated that the Hikvision camera used in the example of FIGS. 5A-5B, accounts for more than one hundred million IP addresses. By clustering similar network devices in accordance with embodiments discussed herein, hundreds of millions or more identified IP addresses can be reduced to only a few thousand clusters or less, and of those few thousand clusters only a few hundred represent a significant number of IP addresses. Using the example of the Hikvision camera used in the example of FIGS. 5A-5B, the more than one hundred million IP addresses are reduced to a single device cluster assigned to the Hikvision camera. As a given IP address fingerprint is potentially against all device clusters, the process continues until either a match is found or each device cluster is considered.

Where no additional device clusters remain to be considered (block 436), a new device cluster is created using the selected IP address fingerprint (block 446). Each of the device clusters is identified by a device cluster fingerprint. Where a device cluster is being created, the device cluster fingerprint for the newly created device cluster is the same as the currently selected IP address fingerprint. In this way, as new network devices are discovered, a device cluster for the newly discovered device is created. This cluster grows over time to include other IP addresses associated with device that is similar to the newly discovered device.

Alternatively, where one or more device clusters remain to be considered (block 436), the first/next of the device clusters is selected (block 438). Again, each of the device clusters is identified by a device cluster fingerprint. A similarity between the device cluster fingerprint and the currently selected IP address fingerprint is calculated (block 440). In some embodiments, a Jaccard similarity coefficient is calculated to represent the similarity between the device cluster fingerprint and the currently selected IP address fingerprint. More specifically, this Jaccard similarity coefficient is used to calculate a similarity between the set_vw and the set_tag of the currently selected IP address fingerprint and the set_vw and the set_tag of the device cluster.

The following is an example Jaccard coefficient equation where U is a set (i.e., IP address fingerprint and device cluster fingerprint) and A (i.e., IP address fingerprint) and B (i.e., cluster device fingerprint) of U:

$$J(A, B) = \frac{|A \cap B|}{|A \cup B|}$$

As shown, the Jaccard index (i.e., J(A,B)) is the ratio of the number of elements of their intersection and the number of elements of their union. The value of the Jaccard index is 0 when the two subsets are disjoint, and 1 when the two subsets are equal. The Jaccard index exhibits a value between 1 and 0 when the two subsets are neither equal nor disjoint, and the more similarity there is between the two subsets the Jaccard index is closer to 1. Based upon the disclosure provided herein, one of ordinary skill in the art will recognize other distance or similarity calculations that are known in the art that can be used in relation to different embodiments.

It is determined whether the calculated similarity suggests that the currently selected IP address fingerprint can be considered the same as the other devices represented by the device cluster fingerprint (block 442). This may include, for example, determining whether the calculated Jaccard index is greater than a programmable threshold value. Where the calculated similarity suggests that the selected IP address fingerprint cannot be considered the same as other devices represented by the device cluster fingerprint (e.g., J(A,B) is less than a programmable threshold value) (block 442), the processes of blocks 536-542 are repeated for the next device cluster. In one particular embodiment, the threshold to which the Jaccard index is compared is programmed as 0.6.

Alternatively, where the calculated similarity suggests that the selected IP address fingerprint can be considered the same as other devices represented by the device cluster fingerprint (e.g., J(A,B) is greater than or equal to a programmable threshold value) (block 442), the IP address associated with the currently selected IP address fingerprint is assigned to the selected device cluster (block 444). This can be done, for example, by storing the IP address in a list associated with the device cluster. At this juncture, the processes of blocks 532-546 are repeated for the next IP address fingerprint.

Turning to FIG. 4C and flow diagram 460, a process for identifying default credential for network devices is performed. A large list of several hundred common default credentials may be tested for each device cluster. The list may include common credentials such as username: Admin, and login: 1234. In some cases, the list is updated as additional default credentials for any network device become known to the implementer of the given embodiment. Based upon the disclosure provided herein, one of ordinary skill in the art will recognize a variety of default credentials used by manufacturers of network devices when selling network devices.

Following flow diagram 460, it is determined if another device cluster remains to be processed (block 462). The processes of flow diagram 460 may be applied to each of the device clusters generated using the process of flow diagram 430. Where no device clusters remain to be processed (block 462), the process returns to await a restart.

Where another device cluster remains to be processed (block 462), the first/next IP address associated with the device cluster is selected (block 464). Any given cluster will be associated with one or more IP addresses, and these IP addresses can be accessed as discussed below in an attempt to discern default credentials. A variable n is initialized to zero (block 466). The variable n is used to count the number of access attempts that have been made to a given IP address. It is important not to make too many unsuccessful attempts to avoid getting locked out.

It is determined if one or more credentials in the list of common default credentials remains to be tested in relation to the currently processing device cluster (block 468). Where no additional credentials remain to be tested (block 468), it is indicated that a default credential for the currently processing device cluster (block 492), and the process begins at block 462 for the next device cluster.

Figure 6:
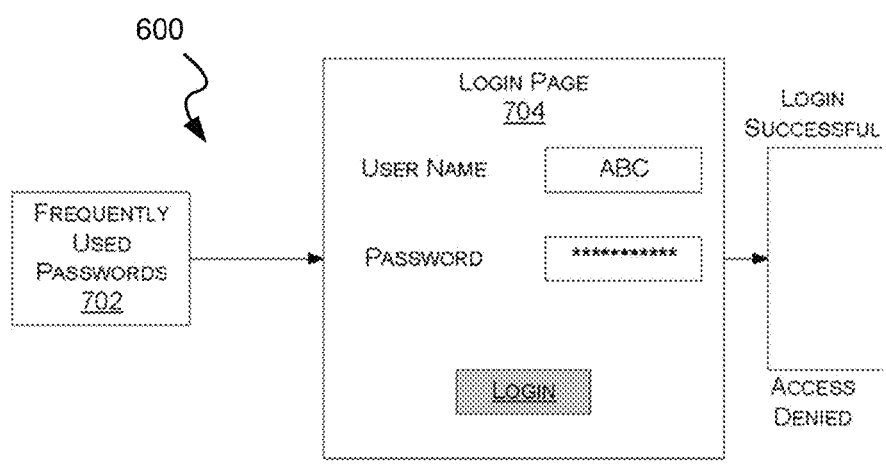
FIG. 6 is a block diagram showing a process for default credential checking in accordance with one or more embodiments.

Alternatively, where one or more additional credentials remain to be tested (block 462), it is determined whether the variable n (i.e., the access attempt counter) is less than a programmable threshold (block 470). Where n is less than the programmable threshold (i.e., attempts to access the currently selected IP address are less than an expected lockout value) (block 470), the first/next credential from the list of common default credentials is selected (block 478) and the currently selected IP address is accessed using the selected default credential (block 480). Turning to FIG. 6, a block diagram 700 shows a process for default credential checking in accordance with one or more embodiments. As shown, a default credential from a group of frequently used passwords 704 is accessed and applied to a login webpage 704 accessed using an IP address associated with the device cluster. In response to entry of the credential entered into login webpage 704, login webpage 704 either returns an error indicating "access denied", or allows access indicating a "login successful".

Returning to FIG. 4C, it is determined whether access to the IP address was granted using the currently selected credential (block 482). Where access was granted (block 482), the currently selected credential is stored in relation to the device cluster as the default credential for network devices of the type grouped into the currently processing device cluster (block 486) and the process continues for the next device cluster.

Alternatively, where access was not granted (block 482), the variable n is incremented (block 484), and the processes beginning at block 470 are started anew. Again, the variable n is used to assure that access attempts are applied to different IP addresses included to in currently processing device cluster to avoid a situation where one IP address is locked because of too many failed access attempts. Thus, where n is not less than the programmable threshold (i.e., attempts to access the currently selected IP address are less than an expected lockout value) (block 470), it is determined if there is another IP address associated with the currently processing device cluster that can be used for access attempts using the list of common default credentials (block 472). Where another IP address associated with the currently processing device cluster remains (block 472), the process begins again for the next IP address associated with the currently processing device cluster (block 464).

Alternatively, where no additional IP addresses associated with the currently processing device cluster remain (block 472), the last credential in the list of common default credentials is identified in relation to the device cluster (block 474). By noting the last credential tested, further testing can begin at the next credential the next time the process of flow diagram 460 is started anew. It is also indicated in relation to the currently processing device cluster that at this juncture there is not a known default credential for the network devices of the type included in the currently processing device cluster (block 476) and the process continues for the next device cluster.

Figure 7:
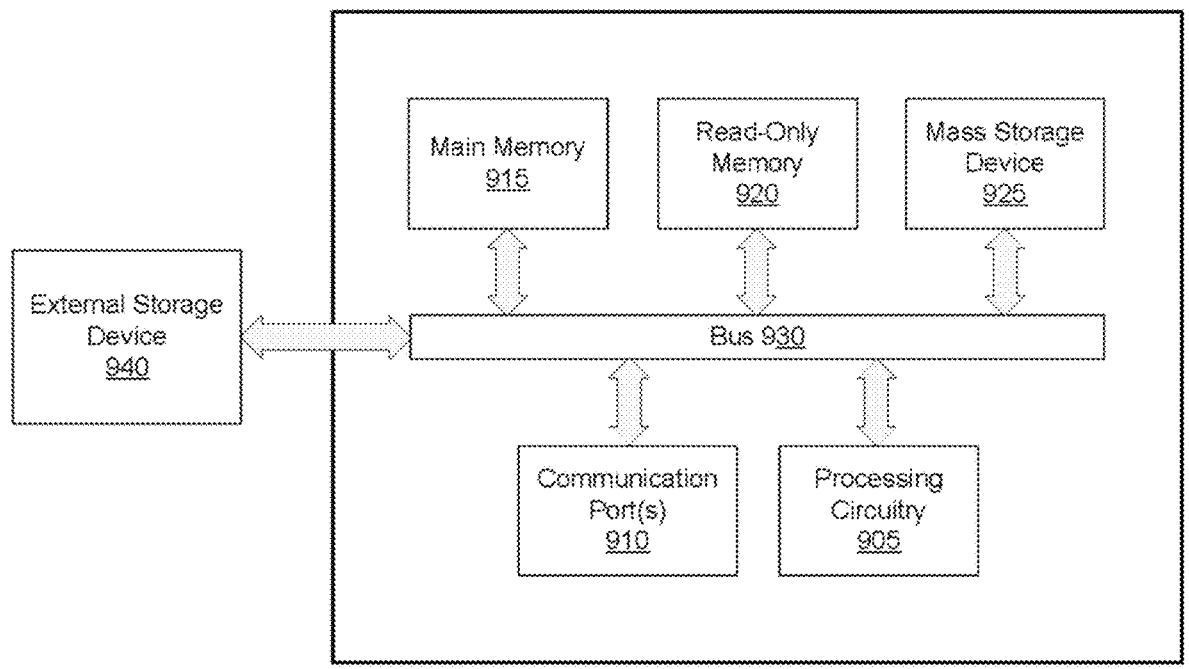
FIG. 7 illustrates an example computer system in which or with which embodiments of the present invention may be utilized.

Turning to FIG. 7 illustrates an exemplary computer system in which or with which embodiments of the present invention may be utilized. As shown in FIG. 7, a computer system includes an external storage device 910, a bus 920, a main memory 930, a read-only memory 940, a mass storage device 950, a communication port 960, and a processor 970.

Those skilled in the art will appreciate that computer system 910 may include more than one processor 970 and communication ports 960. Examples of processor 970 include, but are not limited to, an Intel® Itanium® or Itanium 2 processor(s), or AMD® Opteron® or Athlon MP® processor(s), Motorola® lines of processors, Forti-SOC™ system on chip processors or other future processors. Processor 970 may include various modules associated with embodiments of the present invention.

Communication port 960 can be any of an RS-232 port for use with a modem-based dialup connection, a 10/100 Ethernet port, a Gigabit or 10 Gigabit port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 930 can be Random Access Memory (RAM), or any other dynamic storage device commonly known in the art. Read-Only Memory 940 can be any static storage device(s) e.g., but not limited to, a Programmable Read-Only Memory (PROM) chips for storing static information e.g. start-up or BIOS instructions for processor 970.

Mass storage 950 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 920 communicatively couples processor(s) 970 with the other memory, storage, and communication blocks. Bus 920 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 970 to a software system.

Optionally, operator and administrative interfaces, e.g. a display, keyboard, and a cursor control device, may also be coupled to bus 920 to support direct operator interaction with the computer system. Other operator and administrative interfaces can be provided through network connections connected through communication port 960. An external storage device 910 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method for identifying network vulnerabilities through reducing a number of characterizations used to identify a problematic network element, the method comprising:
   forming, by a processor, a first device cluster, wherein the first device cluster includes: at least a first Internet Protocol (IP) address corresponding to a first type of network device, and a first device cluster fingerprint;
   forming, by the processor, a second device cluster, wherein the second device cluster includes: at least a second IP address corresponding to a second type of network device, and a second device cluster fingerprint;
   forming, by the processor, a third IP address fingerprint of a third IP address;
   comparing, by the processor, the third IP address fingerprint to at least the first device cluster fingerprint of the first device cluster, wherein the third IP address identifies an accessed network device that is similar to the first type of network device, and wherein comparing the third IP address fingerprint to the first device cluster fingerprint includes:
      calculating a Jaccard index between the third IP address fingerprint and the first device cluster fingerprint; and
      comparing the Jaccard index with a threshold; and
   adding, by the processor, the third IP address and the third IP address fingerprint to the first device cluster based at least in part on the comparing the third IP address to the first device cluster.

2. The method of claim 1, the method further comprising:
   comparing, by the processor, the third IP address fingerprint to at least the second device cluster fingerprint of the second device cluster, wherein the third IP address identifies an accessed network device that is dissimilar to the second type of network device.

3. The method of claim 1, the method further comprising:
   accessing, by the processor, a webpage corresponding to the third IP address;
   extracting, by the processor, information from the webpage; and
   wherein forming the third IP address fingerprint is based at least in part on the information.

4. The method of claim 3, wherein the third IP address fingerprint includes at least one word visually displayed when the webpage corresponding to the third IP address is accessed, and at least one Hypertext Mark-up Language (HTML) tag provided when the third IP address is accessed.

5. The method of claim 4, wherein the at least one word visually displayed when the webpage corresponding to the third IP address is accessed includes any combination of: a text word, a logo, or an image.

6. The method of claim 4, wherein the HTML tag further includes one or more of: a metadata tag, and a search keyword.

7. The method of claim 4, wherein the first device cluster fingerprint corresponds to a first IP address fingerprint of the first IP address, wherein the first device cluster fingerprint includes at least one word visually displayed when the webpage corresponding to the first IP address is accessed, and at least one HTML tag provided when the first IP address is accessed.

8. The method of claim 1, wherein the threshold is user programmable.

9. The method of claim 1, the method further comprising:
   accessing, by the processor, one or more IP addresses of the first device cluster using one or more default credentials;
   identifying, by the processor, one of the one or more default credentials that operates to grant access to the first type of network device; and
   storing, by the processor, the identified one of the one or more default credentials as an access credential for the first type of network device.

10. The method of claim 9, the method further comprising:
    accessing, by the processor, one or more IP addresses of the second device cluster using said one or more default credentials;
    identifying, by the processor, one of said one or more default credentials that operates to grant access to the second type of network device; and
    storing, by the processor, the identified one of the one or more default credentials as an access credential for the second type of network device.

11. The method of claim 9, the method further comprising sending by the processor, an alert to one or more users if they are accessing a network including an available suspect network access device of the first type of network access device accessible using the access credential for the first type of network device.

12. The method of claim 1, wherein at least one of the first type of network device is an Internet of Things device.

13. The method of claim 1, the method further comprising:
    assigning, by the processor, a first label to the first device cluster, wherein the first label includes at least one of:

a brand name of the first type of network device, a product name of the first type of network device, or a model number of the first type of network device; and assigning, by the processor, a second label to the second device cluster, wherein the second label includes at least one of: a brand name of the second type of network device, a product name of the second type of network device, or a model number of the second type of network device.

14. A non-transitory computer-readable storage medium embodying a set of instructions, which when executed by one or more processing resources of a computer system, causes the one or more processing resources to perform a method for identifying network vulnerabilities through reducing a number of characterizations used to identify a problematic network element comprising:

forming a first device cluster, wherein the first device cluster includes: at least a first Internet Protocol (IP) address corresponding to a first type of network device, and a first device cluster fingerprint;

forming a second device cluster, wherein the second device cluster includes: at least a second IP address corresponding to a second type of network device, and a second device cluster fingerprint;

forming a third IP address fingerprint of a third IP address;

comparing the third IP address fingerprint to at least the first device cluster fingerprint of the first device cluster, wherein the third IP address identifies an accessed network device that is similar to the first type of network device, and wherein comparing the third IP address fingerprint to the first device cluster fingerprint includes:

calculating a Jaccard index between the third IP address fingerprint and the first device cluster fingerprint; and comparing the Jaccard index with a threshold; and adding the third IP address and the third IP address fingerprint to the first device cluster based at least in part on the comparing the third IP address to the first device cluster.

15. The non-transitory computer-readable storage medium of claim 14, wherein the instructions, which when executed by one or more processing resources of a computer system, causes the one or more processing resources to perform a method comprising:

accessing one or more IP addresses of the first device cluster using one or more default credentials;

identifying one of the one or more default credentials that operates to grant access to the first type of network device; and storing the identified one of the one or more default credentials as an access credential for the first type of network device.

16. The non-transitory computer-readable storage medium of claim 14, wherein the instructions, which when executed by one or more processing resources of a computer system, causes the one or more processing resources to perform a method comprising:

accessing one or more IP addresses of the first device cluster using one or more default credentials;

identifying one of the one or more default credentials that operates to grant access to the first type of network device; and storing the identified one of the one or more default credentials as an access credential for the first type of network device.

17. The non-transitory computer-readable storage medium of claim 14, wherein the instructions, which when executed by one or more processing resources of a computer system, causes the one or more processing resources to perform a method comprising:

comparing the third IP address to the second device cluster, wherein the third IP address identifies an accessed network device that is dissimilar to the second type of network device.

18. The non-transitory computer-readable storage medium of claim 15, wherein the instructions, which when executed by one or more processing resources of a computer system, causes the one or more processing resources to perform a method comprising:

accessing a webpage corresponding to the third IP address;

extracting information from the webpage; and wherein forming the third IP address fingerprint is based at least in part on the information.

19. A network device discovery system for identifying network vulnerabilities through reducing a number of characterizations used to identify a problematic network element, the system comprising:

at least one processor;

a memory, wherein the memory includes instructions executable by the at least one processor to:

form a first device cluster, wherein the first device cluster includes: at least a first Internet Protocol (IP) address corresponding to a first type of network device, and a first device cluster fingerprint;

form a second device cluster, wherein the second device cluster includes: at least a second IP address corresponding to a second type of network device, and a second device cluster fingerprint;

form a third IP address fingerprint of a third IP address;

compare the third IP address fingerprint to at least the first device cluster fingerprint of the first device cluster, wherein the third IP address identifies an accessed network device that is similar to the first type of network device, and wherein comparing the third IP address fingerprint to the first device cluster fingerprint includes:

calculating a Jaccard index between the third IP address fingerprint and the first device cluster fingerprint; and comparing the Jaccard index with a threshold; and add the third IP address and the third IP address fingerprint to the first device cluster based at least in part on the comparing the third IP address to the first device cluster.

20. The network device discovery system of claim 19, wherein the memory further instructions executable by the at least one processor to:

access one or more IP addresses of the first device cluster using one or more default credentials;

identify one of the one or more default credentials that operates to grant access to the first type of network device; and store the identified one of the one or more default credentials as an access credential for the first type of network device.

* * * * *